Figures 1, 2, 3, 4:
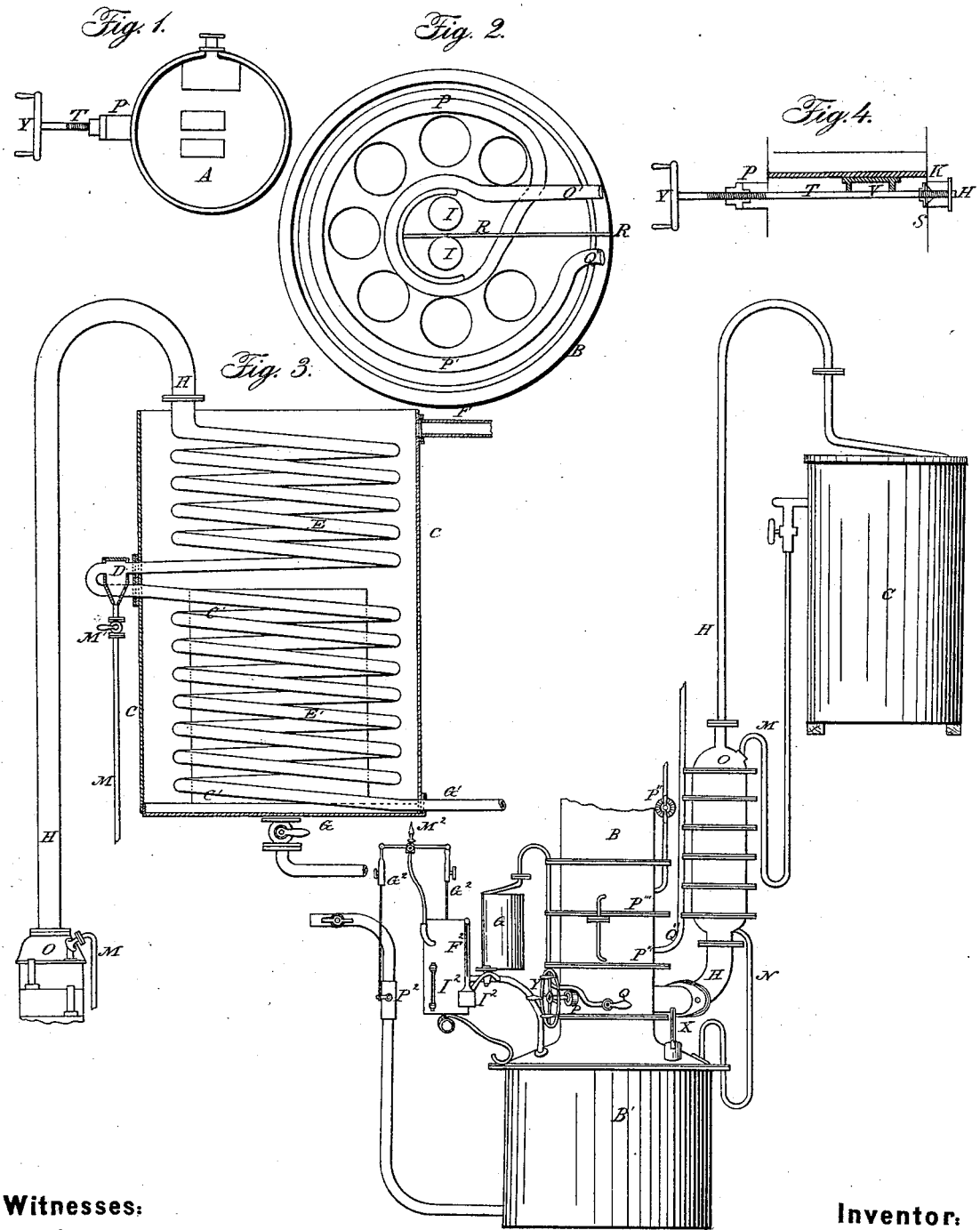
Figure 1:
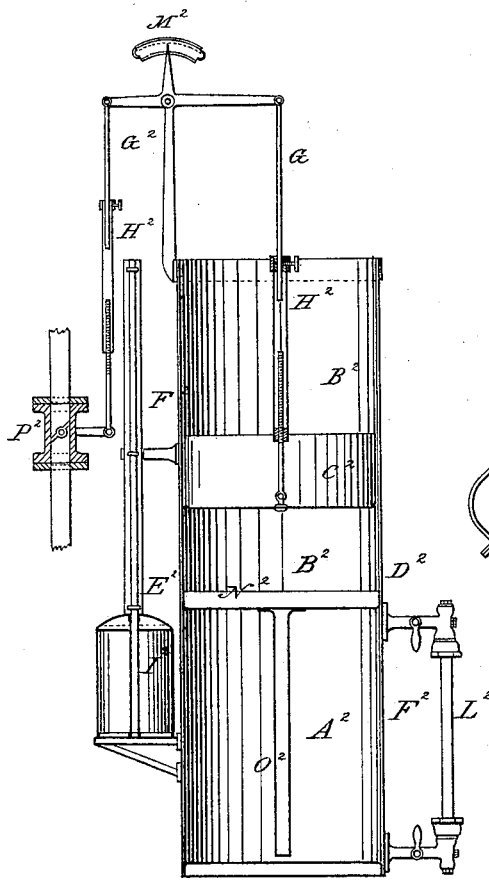
Figure 2:
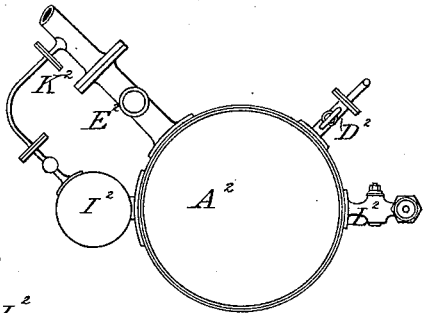

FOUBERT & BEQUET.
Alcohol Still.
No. 50,668. Patented Oct. 24, 1865.

2 Sheets—Sheet 1.

Witnesses:
Inventor:

FOUBERT & BEQUET.
Alcohol Still.

No. 50,668.

2 Sheets—Sheet 2.

Patented Oct. 24, 1865.

Witnesses:

Inventor:

UNITED STATES PATENT OFFICE.

ANASTASIE ADRIENNE FOÜBERT, OF ST. HELIER, ISLAND OF JERSEY, ENGLAND, AND JEAN GUSTAVE BEQUET, OF PARIS, FRANCE.

IMPROVED APPARATUS FOR RECTIFYING ALCOHOL.

Specification forming part of Letters Patent No. 50,668, dated October 24, 1865.

*To all whom it may concern:*

Be it known that we, JEAN GUSTAVE BEQUET, of Paris, in the Empire of France, and ANASTASIE ADRIENNE FOÜBERT, of St. Helier, in the Island of Jersey, England, have invented a new and useful System of Apparatus for Rectifying Alcohol; and we do hereby declare that the following is a full and exact description thereof, reference being had to the accompanying drawings, and to the letters of reference marked thereon.

Hitherto all apparatus for rectifying alcohol were made up of a boiler or retort, a column with plates, and several condensers or analyzers which received the alcoholic vapors issuing from the column or still-head. In these apparatus the vapors from the column traversed the different compartments of the column in which they were being concentrated, meeting successive layers of alcoholic matter of a richer description. These vapors then entered the analyzers, where, owing to a certain temperature regulated by currents of water, the aqueous portions still contained in the vapors were condensed and made to return into the column, to be subjected anew to vaporization. By this arrangement the first vapors generated in the boiler, which are generally the most volatile and the most distasteful, are, of necessity, obliged to pass through the whole apparatus, thus impregnating every surface thereof, and thereby rendering it necessary to get rid of a certain quantity of alcohol of bad taste, called "*Mi-goût*" and "*Mauvais goût*," which issues at the gage charged with those disagreeable smells that result from the ethereal products, which smells go on decreasing until the distilling-surfaces are sufficiently cleansed to produce good-flavored spirit ("*Bon goût.*") This arrangement also is defective, inasmuch as at the end of the operation another quantity of bad-flavored alcohol is produced, owing to the amylic oils, which, being less volatile than alcohol, are developed last. These oils not being retained or fixed by the analyzers, their passage through the gage cannot be prevented by reason of the short travel they have to perform through the parts before passing into the refrigerator or cooler. At the beginning of the operation the first ethereal and odoriferous vapors are condensed completely.

In order to avoid these difficulties and insure a sure and exact working of the rectifier, so as to give constant or continuous results, we have contrived the following arrangement, (shown on the annexed sheets of drawings:)

Sheet 1 shows an elevation of the improved apparatus complete with all its appendages, B' being the boiler mounted with the usual column or still-head, B. The passage of the vapor into the column is prevented by a diaphragm, A, (see Sheet 2, plan Figure 1,) fitted with a slide-valve, V, which is worked by means of a screwed rod, T.

H is the usual return-pipe, as shown in plan, Sheet 2, Fig. 3. On the right-hand side of the first cylinder or column, B, below the diaphragm A, we adapt the escape-pipe H, which leads the vapor into the analyzers O and C E, Fig. 3, Sheet 2. One of these, O, consists of six plates of wire-gauze, with overflow-pipe and buckets or bells, and to the dome of which is fixed the return-pipe M from the second analyzer, E, Fig. 3, Sheet 2, which return-pipe communicates with the boiler by a plunger-pipe, N, fixed to the analyzer by means of a joint and siphon. The other analyzer E consists of an ordinary cooling-worm, which is contained in a cylindrical vessel or tub, C, Sheet 2, Fig. 3, fitted with a water-separator, C', in which cold water is made to circulate. This worm or helix is cut at the fifth coil, so as to form two divisions, which are united by a pipe, D, to which the return-pipe M and the stop-cock M' are attached. At the beginning and at the end of the operation, the vapor is conducted through the pipe H, passes through the small column or analyzer O, where it undergoes a first or preparatory analysis; then enters from above into the refrigerating-worm E, where it condenses, and then precipitates into the lower serpentine or worm, E, care being taken to keep the cock M' shut during the evaporation of the ethereal oils. These first products of distillation are let out by the lower coil end, G V, or test-pipe. G is the stop-cock for regulating the supply of the cooling-water; F, overflow-pipe.

The following are the advantages derived from this arrangement: By forcing the refrigeration by means of water, and by continuing the same until the charge of the boiler be completely purged of those ethereal products, the column is then opened by turning the wheel Y on the slide-rod T, which carries, besides the slide V, a clack-valve, S, which is intended to close the orifice of the ether or bad-flavor pipe, the slide-ports being opened at the same time, thus allowing the two operations to be performed simultaneously by merely screwing the slide-valve rod T in or out in its screwed sockets or stuffing-boxes K and P. The ports of the plate or diaphragm A being opened, and the valve S closed or seated, the vapors from the boiler then take their ordinary course; but before ascending into the column they have to undergo a primary analysis, which is effected by means of a worm, P′, in the cylinder or column B, Sheet 2, Fig. 2, through which cold water is kept circulating, and which plunges into the liquid, covering the second and third plate, Sheet 1, P′′′ P′′′. The flow of water in this coil is regulated by means of a stop-cock and dial, P′′, Sheet 1, at the issue of the heated water. The circulation takes place from below upward. This primary analysis of vapor may also be obtained by shutting the bottom of the plates by two metallic sheets set at the distance of about one inch, so as to act in lieu of the coil for the circulation of the water.

The apparatus is worked in the usual mode, and the full-flavored vapor which is not condensed will alone ascend in the column.

The operation is conducted in the manner described until it is found that the full-flavored spirit is all evaporated and the bad-flavored spirits mixed with anylic oils begin to accumulate in the column. The stop-cock 9, Sheet 1, under the diaphragm A, is then opened, which communicates with the testing refrigerator or indication G′, Sheet 1, and as soon as (by Gaydussac's centigrade alcoholmeter or hydrometer) the condensed alcohol only gages 30° the column is shut, and the cock M′ of the return-pipe M is opened, so as to establish a communication with the small column or first analyzer, O. The alcoholic vapor changes its direction instantly on the slide-valve being closed, so as to traverse the plates of the first analyzer, in which it leaves the bad products, which, by the overflow-pipes, return into the boiler or retort. The vapor thus purified then ascends into the condenser E, Fig. 3, Sheet 2, in which the aqueous molecules are being eliminated, which then return into the small cylinder or column through the return-pipe M, so as to act as an auxiliary to the first analysis of the following quantities of alcoholic vapors that arise from the boiler: The water of the condensing-refrigerator, whose temperature is kept between 80° and 85° Celsius or centigrade, allows circulation in the upper coils of the worm to the more volatile portions of the alcoholic vapor, which is thus gradually rectified and finally condensed in the lower coils and drawn off at the bottom by the test-pipe G′. It will be seen that by this *modus operandi*, and supposing all the other parts of the apparatus to be constructed and fitted in the manner now generally known and practiced, we stop all the bad-flavored vapors produced both at the beginning and at the end of the operation in analyzers of different forms that do not allow the vapors of bad taste to pass through the plates of the main cylinder or column, nor through the superior analyzers applied thereto; hence the full-flavored alcohol never need pass through the parts of the apparatus that contain bad products, and the separation of the two classes of goods is thus made as complete as desirable. This separation may be obtained by various other arrangements by means of an obturating contrivance of any description, such as a regulator or a stop-cock connected with the first plate of the column, and a pipe fitted with a cock or valve, by which the vapors are conveyed direct from the boiler to a special refrigerator provided for that purpose.

On the annexed sheets of drawing the following letters designate some other well-known implements of the rectifying apparatus: N, Sheet 1, return-pipe to the boiler; Q′, Fig. 2, Sheet 2, hot-water pipe; Q′′, cold-water pipe; R, partition between the overflow-pipes I, which are capped in the ordinary way with the usual bubbling bells or cups.

Another portion of this invention relates to an improved apparatus for regulating the pressure of the alcoholic vapors in the boiler of the rectifier or distilling apparatus, so as to prevent the variations produced by varying pressures in the steam-boiler and dispense with the continuous attendance of the operator to this part of the process.

Several contrivances have already been devised for attaining said purpose, and among them the one that bears most resemblance to our plan is the regulator invented by Champonnois in 1855, in which he makes use of the pressure of the boiler, causing it to act upon an open-air monometer or common pressure-gage, connected with the retort or boiler, in the open end of which a float works up and down and acts upon a throttle-valve similar to those used in steam-engines, by which the supply of the heating-steam is regulated. This arrangement, such as described, however infallible in theory, is attended with practical defects preventing its being carried into effect, because, first, the alcoholic vapor will condense in the chamber, collect and heat therein, so as to vaporize and escape round the float, and thus offering great danger of firing; second, no provision is made in the said apparatus for varying the pressure and the calefaction during the different phases of the process, which is a very desirable object, as thereon depends the regular and satisfactory working of the rectifying apparatus.

Our improved regulator is shown in elevation on Sheet 1, attached to the rectifying apparatus, and on Sheet 3 detached, Fig. 1 being a vertical section of the regulator, and Fig. 2 a plan; $A^2$, hot water chamber or recipient;

B², float-cylinder; C², float acting upon the throttle-valve; P² D², Fig. 2, feed-pipe and cock for supplying the hot water; E², cock and pipe for introducing the alcoholic vapor, acting also as an overflow; F², wood casing covering the apparatus; G², connecting-rods, which are made adjustable in the sheaths H² by means of set-screws; I², ordinary pressure-gage; K², alcoholic vapor-pipe; L², water-gage; P², throttle-valve.

In order to avoid the condensation of the alcoholic vapor in the chamber or recipient A² of the regulator, we derive a supply of hot water of about 85° centigrade through the pipe D², which may be furnished by any condenser, thus feeding the recipient continuously and preventing the condensation of the alcohol. The surplus water is got rid of by the alcoholic-vapor pipe E², the latter having a diameter somewhat larger than would be required for the passage of the vapor solely. The casing indicated by the letter F is intended to prevent the temperature lowering.

In order to vary the action of the regulator to suit the pressure of the various rectifying apparatus, we have applied to each of the rods of the float a ferrule with a set screw, G², by means of which the connecting-rods can be lengthened or shortened at pleasure. The connecting-rods also carry divisions, so as to guide the operator in setting the connecting-rods to the proper length, and in order to be able to ascertain the degree of pressure required, we attach a common pressure-gage, drawing its supply of vapor through the tube K² from the pipe E². The water-gage L² tells the level of the water in the lower part of the recipient, the alcoholic vapor entering by the pipe E² below the plate N², and forcing the water up through the siphon-pipe O² into the upper portion of the cylinder, where the said pressure is transmitted to the float C, which has the proper buoyancy.

We claim—

1. The plate or diaphragm A, Fig. 1, Sheet 2, allowing the direction of the alcoholic vapors to be changed whenever required and at the beginning and end of each charge operated upon substantially as described, and for the purposes set forth.

2. The slide-valve V and clack-valve S on one valve-rod, T, Fig. 4, Sheet 2, by which the ports of the diaphragm A are opened and the pipe H is shut, or vice versa, at one operation, for the purposes herein set forth.

3. The primary condensers P' and O, Fig. 2, Sheet 2 and Sheet 1, substantially as described.

4. The self-acting regulator, Sheet 3, for controlling the feed of steam to the retort, in combination with the chamber or recipient A², in which hot water is made to circulate, in order to prevent the alcoholic vapors from condensing, substantially as described, and for the purposes set forth.

5. The indicator G, Sheet 1, which takes its supply of steam at the first bell-plate of the column B below the diaphragm A by means of a cock, 9, substantially as set forth.

6. The cooling-condenser E E', Fig. 3, Sheet 2, the worm of said condenser being divided in two portions at the fifth coil, for the purposes set forth, and in the manner herein described.

J. G. BEQUET.
A. A. FOÜBERT.

Witnesses as to signature of J. G. Bequet:
F. TOLHAUSEN,
CHAUDESAIGNELLE.

Witnesses as to signature of A. A. Foübert:
CHAUDESAIGNELLE,
WOULAIN.